Patented Nov. 16, 1926.

1,607,492

UNITED STATES PATENT OFFICE.

ROBERT FRASER THOMSON AND JOHN THOMAS, OF GRANGEMOUTH, SCOTLAND, ASSIGNORS TO SCOTTISH DYES, LIMITED, OF GRANGEMOUTH, SCOTLAND.

MANUFACTURE OF DYESTUFFS AND INTERMEDIATES.

No Drawing. Application filed February 20, 1926, Serial No. 89,769, and in Great Britian October 21, 1924.

This invention relates to the manufacture of dyestuffs and intermediates for the production of dyestuffs.

It has for its object to provide new methods of making coloring matters, particularly intermediates for the manufacture of dyestuffs of the benzanthrone series.

To that end we have made experiments and we have discovered that when benzanthrone is treated under certain conditions, for example by manganese dioxide and sulphuric acid, either of two reactions may take place, namely, a condensation of two benzanthrone molecules or an oxidation of benzanthrone.

The result of the first process may be regarded as the formation of a dibenzanthronyl different from the dibenzanthronyl previously known, that is the body prepared by the condensation of benzanthrone in a mild alkaline medium, in that on fusion with caustic alkali it will yield dibenzanthrone.

The result of the second process is the formation of oxy-benzanthrone which we have found can be alkylated and the product fused with caustic alkali, thus giving coloring matters.

The invention consists in the treatment of benzanthrone with an oxidizing agent comprising, for example, manganese dioxide and sulphuric acid to such a degree as to yield an oxy-benzanthrone as herein defined.

The invention includes the preparation of alkoxy-benzanthrones and other benzanthrone derivatives as indicated below.

The invention also consists in the processes hereinafter described and in products when produced thereby.

The following examples illustrate how the invention may be carried into effect, all parts in these examples being parts by weight.

*Example 1..*

This deals with the production of an oxy derivative of benzanthrone.

Benzanthrone is oxidized by means of sulphuric acid and manganese dioxide using the following proportions:—23 parts of benzanthrone (recrystallized); 400 parts of concentrated sulphuric acid; 16.5 parts manganese dioxide (equal to 50 per cent excess of theory).

The benzanthrone is dissolved in the acid at 60° C. during 15 minutes and stirred for ½ hour. The manganese dioxide is added at 60° C. during one hour, and the whole is maintained at 60° C. for 5½ hours. The progress of the oxidation may be followed during this time by the change in color of the sulphuric acid solution; this is originally brilliant scarlet but as the oxidation proceeds it becomes red-violet. As soon as this color becomes no bluer, the oxidation is stopped and worked up by dilution with water, reduction with 40 per cent bisulphite solution and boiling and filtering. The crude oxidation product in the form of paste is now boiled with 500 parts of ½ per cent caustic soda solution and filtered, the filtrates being dark green. The alkaline filtrate may be reprecipitated by neutralizing with hydrochloric acid and the precipitate filtered, washed and dried. In this way, about 17 parts of product insoluble in alkali are obtained and 3.7 parts soluble in alkali and reprecipitated.

*Example 2.*

This deals with the alkylation of the alkali soluble portion of Example 1.

According to this example the alkylation is carried into effect by using the following bodies in substantially the proportions given below, namely:—7.4 parts of oxidation product; 15 parts of sodium carbonate; 100 parts of nitrobenzene; 10 parts of dimethyl sulphate.

The above mixture is heated in a vessel provided with a reflux condenser for about three hours and the melt may then be filtered hot. The result of this filtration is to give a precipitate of inorganic salts, for example sodium sulphate, together with solid products which have not been acted on and impurities and a filtrate containing dimethoxy-dibenzanthrone in solution in nitrobenzene. The nitrobenzene may be removed by steam distillation or by evaporation followed by steam distillation or the melt may be evaporated without filtration and the solvent removed by steam distillation.

In this way 5 parts of a brownish-black crystalline body are obtained. This body may be recrystallized from its solution in benzene and is then obtained in small plates melting at 158° C. to 162° C. The crystallized substance may be again recrystallized from benzene, the resulting product having a melting point about 148° C. to 152° C. The recrystallized body consists of a fine brownish-black crystalline powder which dissolves in concentrated sulphuric acid with a violet color, yielding a green intermediate color on partial dilution and a brown precipitate on final dilution with water.

Example 3.

This is an example of the conversion of the methylated oxy-benzanthrone resulting from Example 2 into the desired coloring matter by fusion with caustic alkali.

50 parts of the methylated oxy-benzanthrone prepared by the process of Example 2 are entered into a mixture of 175 parts of caustic potash and 105 parts of alcohol at a temperature of 125° C. The temperature is raised to 180° C. and kept at this for 30 minutes. It is then raised to 200° C. and kept at this for one hour. The melt is then run into a large excess of water and boiled vigorously until all the dyestuff is oxidized and precipitated. It is then filtered and washed in the usual way and is ready for dyeing.

The product thus obtained dyes cotton blue shades from an alkaline hydrosulphite vat which turn a brilliant green on oxidation.

General.

Modifications may be made in the processes described, for instance the crystallization of the methylated oxy-benzanthrone may be made from xylene, acetic acid and alcohol instead of benzene but the latter is preferred, the product being difficultly soluble in acetic acid and in alcohol.

Other alkylating agents besides dimethyl sulphate may be employed.

In place of caustic potash aqueous potash or alcoholic potash may be employed.

Purification of the coloring matters may be effected by precipitation from sulphuric acid solution by means of a non-solvent.

In place of benzanthrone, derivatives of benzanthrone may be employed, for example chlorinated benzanthrone, for instance monochlor-benzanthrone prepared from 2-chloranthraquinone by reduction and condensation by glycerine.

Having now described our invention, what we claim as new and desire to secure by Letters Patent is:—

Process of treating benzanthrone which comprises subjecting the same to the oxidizing action of manganese dioxide and sulphuric acid, the oxidation being of such a degree as to yield oxy-benzanthrone.

In testimony whereof we have signed our names to this specification.

ROBERT FRASER THOMSON.
JOHN THOMAS.